US011161602B2

(12) United States Patent
Bottasso et al.

(10) Patent No.: US 11,161,602 B2
(45) Date of Patent: *Nov. 2, 2021

(54) TRANSMISSION FOR ROTOR FOR AN AIRCRAFT CAPABLE OF HOVERING

(71) Applicant: LEONARDO S.P.A., Rome (IT)

(72) Inventors: Luigi Bottasso, Samarate (IT); Antonio Zocchi, Samarate (IT); Massimo Brunetti, Samarate (IT); Luca Medici, Samarate (IT); James Wang, Samarate (IT); Giorgio Lucchi, Rimini (IT)

(73) Assignee: LEONARDO S.P.A., Rome (IT)

( * ) Notice: Subject to any disclaimer, the term of this patent is extended or adjusted under 35 U.S.C. 154(b) by 275 days.

This patent is subject to a terminal disclaimer.

(21) Appl. No.: 16/473,701

(22) PCT Filed: Dec. 29, 2017

(86) PCT No.: PCT/EP2017/084804
§ 371 (c)(1),
(2) Date: Jun. 26, 2019

(87) PCT Pub. No.: WO2018/122370
PCT Pub. Date: Jul. 5, 2018

(65) Prior Publication Data
US 2019/0352000 A1     Nov. 21, 2019

(30) Foreign Application Priority Data
Dec. 30, 2016    (EP) ..................................... 16207535

(51) Int. Cl.
*B64C 27/12*     (2006.01)
*B64C 27/00*     (2006.01)

(52) U.S. Cl.
CPC ............ *B64C 27/12* (2013.01); *B64C 27/001* (2013.01); *B64C 2027/003* (2013.01)

(58) Field of Classification Search
CPC .......... B64C 27/12; B64C 27/32; B64D 41/00
See application file for complete search history.

(56) References Cited

U.S. PATENT DOCUMENTS 2,340,241 A * 1/1944 Woods ..................... F16H 3/722
475/94
2,648,387 A * 8/1953 Doman ................... B64C 27/41
416/114
(Continued)

FOREIGN PATENT DOCUMENTS

EP           2610525 A1     7/2013

OTHER PUBLICATIONS

International Search Report and Written Opinion in corresponding International Patent Application No. PCT/EP2017/084804 dated May 2, 2018. 12 pages.

*Primary Examiner* — Joseph W Sanderson
(74) *Attorney, Agent, or Firm* — Leason Ellis LLP

(57) ABSTRACT

A rotor for an aircraft capable of hovering includes a stationary support structure and a rotative element, which is rotatable about a first axis with respect to said stationary support structure with a first rotational speed. The rotor includes at least one blade, which is operatively connected with said rotative element; and a transmission group, which includes an output element rotatable about first axis with a second rotational speed different from first rotational speed.

8 Claims, 4 Drawing Sheets

(56) References Cited

U.S. PATENT DOCUMENTS

| | | | | |
|---|---|---|---|---|
| 2,772,745 A * | 12/1956 | Bordoni | ............... | B64C 27/12 416/130 |
| 3,067,824 A * | 12/1962 | Sullivan | ............... | B64C 27/12 416/110 |
| 3,735,945 A * | 5/1973 | Huvers | ............... | B64C 27/12 244/17.19 |
| 4,302,154 A * | 11/1981 | Mack | ............... | B64C 27/58 416/114 |
| 5,607,122 A * | 3/1997 | Hicks | ............... | B64C 27/78 244/17.19 |
| 5,704,567 A * | 1/1998 | Maglieri | ............... | B64D 15/12 244/134 D |
| 6,769,874 B2 * | 8/2004 | Arel | ............... | B64C 11/02 416/60 |
| 6,902,508 B2 * | 6/2005 | Stille | ............... | B64C 27/12 464/182 |
| 8,162,611 B2 * | 4/2012 | Perkinson | ............... | B64C 11/06 416/162 |
| 8,294,316 B2 * | 10/2012 | Blackwelder | ............... | B64D 15/12 310/115 |
| 8,534,596 B2 * | 9/2013 | Lauder | ............... | B64C 27/10 244/17.19 |
| 8,550,950 B2 * | 10/2013 | Bagdonis | ............... | B64C 27/12 475/221 |
| 8,740,565 B2 * | 6/2014 | Perkinson | ............... | B64C 11/48 416/129 |
| 8,757,972 B2 * | 6/2014 | Perkinson | ............... | B64D 15/12 416/1 |
| 8,795,123 B2 * | 8/2014 | Gasparini | ............... | F16H 57/04 475/159 |
| 9,024,505 B2 * | 5/2015 | Doyle | ............... | B64C 27/605 310/268 |
| 9,725,179 B2 * | 8/2017 | Aubert | ............... | B64D 15/12 |
| 9,828,109 B2 * | 11/2017 | Mitrovic | ............... | B64C 11/44 |
| 9,973,058 B2 * | 5/2018 | Perkinson | ............... | H02K 7/1823 |
| 10,053,212 B2 * | 8/2018 | Sheridan | ............... | B64C 27/10 |
| 10,243,424 B2 * | 3/2019 | Raad | ............... | B64D 15/12 |
| 10,717,543 B2 * | 7/2020 | Mitrovic | ............... | B64C 11/44 |
| 2004/0080234 A1 * | 4/2004 | Arel | ............... | B64D 15/12 310/261.1 |
| 2005/0153812 A1 | 7/2005 | Box et al. | | |
| 2010/0021295 A1 * | 1/2010 | Perkinson | ............... | B64C 11/06 416/1 |
| 2010/0270423 A1 * | 10/2010 | Lauder | ............... | B64C 7/00 244/17.19 |
| 2011/0024567 A1 * | 2/2011 | Blackwelder | ............... | F02K 3/072 244/134 D |
| 2012/0299428 A1 * | 11/2012 | Doyle | ............... | B64C 27/605 310/154.43 |
| 2013/0039759 A1 * | 2/2013 | Perkinson | ............... | B64C 11/306 416/1 |
| 2013/0039764 A1 * | 2/2013 | Perkinson | ............... | B64C 11/306 416/129 |
| 2013/0172143 A1 * | 7/2013 | Gasparini | ............... | B64C 27/12 475/159 |
| 2013/0228654 A1 * | 9/2013 | Aubert | ............... | B64D 15/12 244/134 D |
| 2014/0312722 A1 * | 10/2014 | Raad | ............... | H02K 7/006 310/52 |
| 2016/0229549 A1 * | 8/2016 | Mitrovic | ............... | F16H 3/666 |
| 2016/0233740 A1 * | 8/2016 | Perkinson | ............... | H02K 7/1823 |
| 2017/0005548 A1 * | 1/2017 | Salat | ............... | B64D 15/12 |
| 2017/0190415 A1 * | 7/2017 | Sheridan | ............... | F16H 1/46 |
| 2018/0118369 A1 * | 5/2018 | Mitrovic | ............... | B64D 27/10 |
| 2019/0329876 A1 * | 10/2019 | Brunetti | ............... | B64C 27/12 |
| 2020/0122825 A1 * | 4/2020 | Bottasso | ............... | B64D 41/00 |

* cited by examiner

US 11,161,602 B2

TRANSMISSION FOR ROTOR FOR AN AIRCRAFT CAPABLE OF HOVERING

CROSS-REFERENCE TO RELATED PATENT APPLICATIONS

This application is a U.S. National Phase Application under 35 U.S.C. § 371 of International Patent Application No. PCT/EP2017/084804, filed Dec. 29, 2017, which claims priority from European Patent Application No. 16207535.2 filed on Dec. 30, 2016, the disclosure of which is incorporated by reference.

TECHNICAL FIELD

The present invention relates to a rotor for an aircraft capable of hovering, in particular a helicopter or a convertiplane.

BACKGROUND ART

Known helicopters comprise a fuselage, a main rotor upwardly protruding from the fuselage and a tail rotor which is arranged at a tail of the fuselage.

Furthermore, known helicopters comprise a turbine, a main transmission group which transmits the motion from the turbine to the main rotor, and an additional transmission group which transmits the motion from the main transmission group to the tail rotor.

Main rotor and tail rotor comprise, each:
a stationary case;
a mast which is driven in rotation by the main or the additional transmission group about its own axis;
a hub driven in rotation by the mast; and
a plurality of blades which are articulated with respect to the hub.

Mast, hub and blades are driven in rotation first rotational speed about the axis with respect to the stationary case.

A need is felt in the art to drive accessory components inside the rotor at a second rotational speed different from the first rotational speed of the mast and the hub, without affecting the resulting size and weight of the rotor and without requiring a substantial re-design of the rotor.

For example, the drive accessory components could be represented by a vibration damper based on counter-rotating masses which requires to be tuned to a given vibration frequency dependent on the rotational speed of the mast; this requires the masses to be rotated at two rotational speeds which are different from the rotational speed of the mast in modulus and, for one of the masses, also in direction.

US-A-2015/0153812 discloses a rotor for an aircraft.

DISCLOSURE OF INVENTION

It is an object of the present invention to provide a rotor for an aircraft capable of hovering, which meets at least one of the above requirements.

The aforementioned object is achieved by the present invention as it relates to a rotor for an aircraft capable of hovering.

BRIEF DESCRIPTION OF THE DRAWINGS

Three preferred embodiments are hereinafter disclosed for a better understanding of the present invention, by way of non-limitative example and with reference to the accompanying drawings, in which.

BEST MODE FOR CARRYING OUT THE INVENTION

Figure 1:
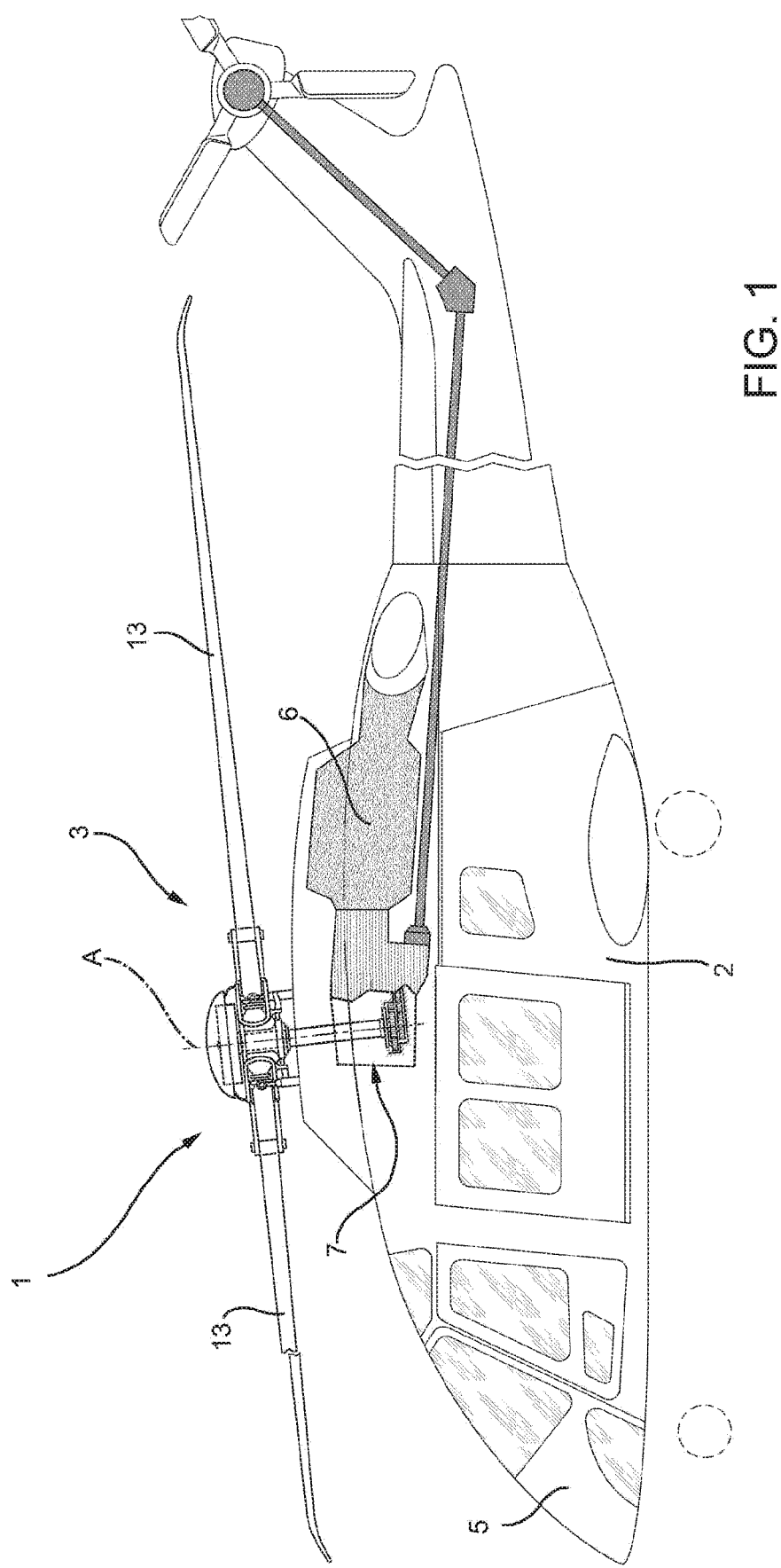
FIG. 1 is a schematic view of a helicopter comprising a rotor in accordance to the present invention.

With reference to FIG. 1, numeral 1 indicates an aircraft capable of hovering, in particular a helicopter.

Helicopter 1 essentially comprises (FIG. 1) a fuselage 2 with a nose 5; a main rotor 3 fitted to the top of fuselage 2 and rotatable about an axis A; and an anti-torque tail rotor 4 fitted to a fin projecting from fuselage 2 at the opposite end to nose 5.

More specifically, main rotor 3 provides helicopter 1 with the lift to raise it, and the thrust to move it forward, while rotor 4 exerts force on the fin to generate a straightening torque on fuselage 2. The straightening torque balances the torque exerted on fuselage 2 by main rotor 3, and which would otherwise rotate fuselage 2 about axis A.

Helicopter 1 also comprises:
a pair of turbines 6 (only one of which is shown);
a main transmission group 7, which transmits the motion from turbine 6; and
an additional transmission group 8, which transmits the motion from main transmission group 7 to tail rotor 4.

Figure 2:
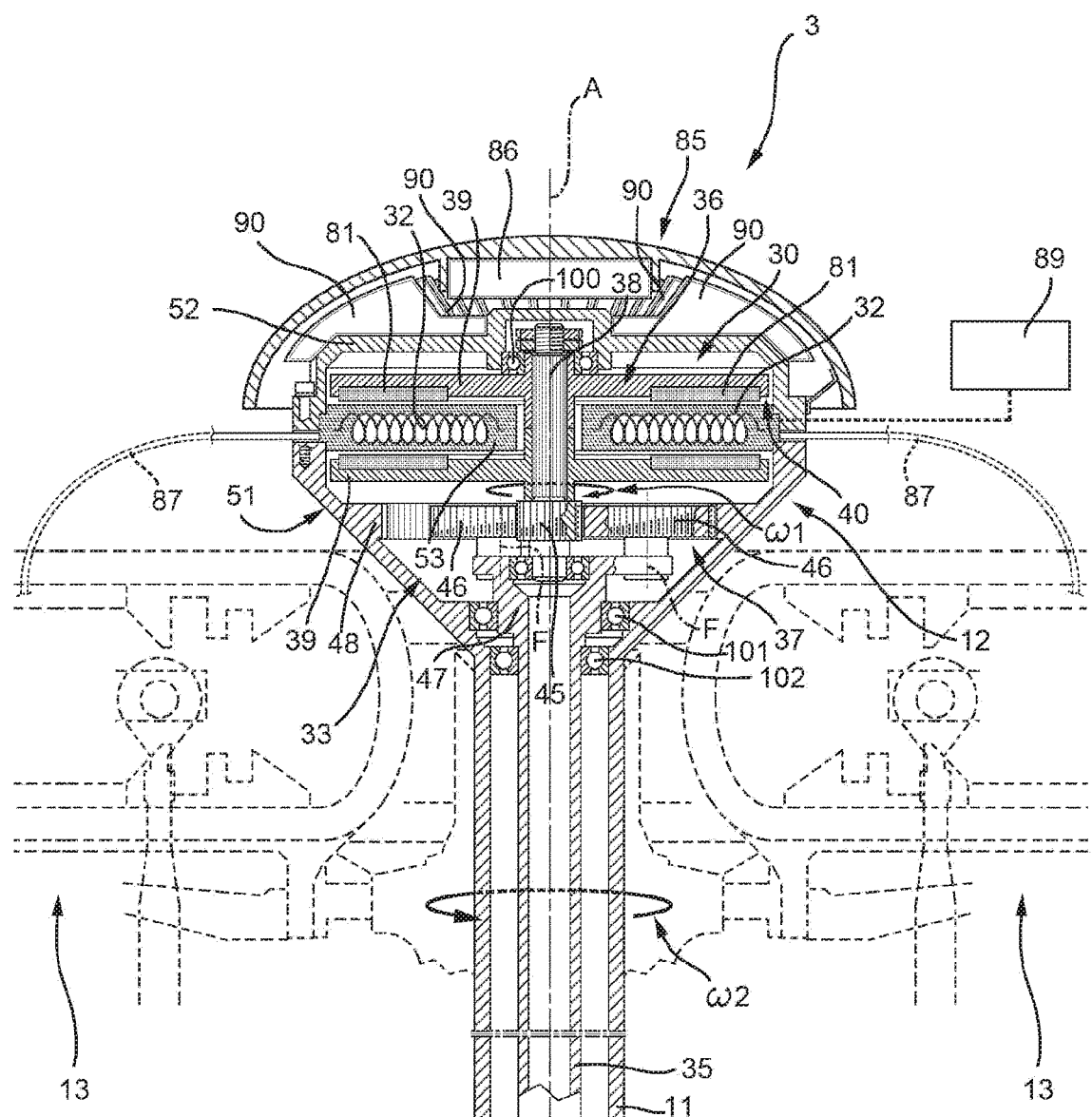
FIG. 2 is a transversal section of a first embodiment of the rotor of FIG. 1.

With reference to FIG. 2, rotor 3 substantially comprises:
a support element 10, which is fixed to fuselage 2;
a mast 11, which is rotatable about an axis A with respect to support element 10;
a hub 12, which is rotationally integral to mast 11; and
a plurality of blades 13 (only two of which are shown in FIG. 2), which are articulated onto hub 12.

In the embodiment shown, support element 10 is stationary with respect to axis A.

Mast 11, hub 12 and blades 13 are driven in rotation about axis A with a rotational speed $\omega 1$.

Furthermore, support element 10, mast 11 and hub 12 are hollow.

Rotor 3 also comprises an epicyclic gear train 17, which transmits the motion from an end shaft (not shown) of main transmission group 7 to mast 11 and hub 12.

In detail, epicyclic gear train 17 is coaxial to axis A and comprises:
a sun gear 20 which is driven in rotation about axis A and comprises a radially outer toothing;
a plurality of planet gears 21 (only two shown in FIG. 1) which comprise, each, a radially inner toothing meshing with sun gear 20 and a radially outer toothing meshing with a radially inner toothing defined by support element 10; and
a carrier 22 which is rotationally integral with and connected to gears 21 and to mast 11.

In particular, support element 10 acts as a stationary crown 23 of epicyclic gear 17.

Planet gears 21 rotate about relative axes E parallel to axis A and revolve about axis A.

Advantageously, rotor 3 comprises a transmission group 33, which comprises an output element, in the following of the present description referred to as support element 36, which rotates about axis A with a rotational speed ω1 different from rotational speed ω2 with which mast 11 and hub 12 rotate.

In the embodiment shown, transmission group 33 comprises an epicyclic group 37.

Rotor 3 further comprises:
- a shaft 35, which is elongated parallel to axis A and is fixed to support structure 10;
- a support element 36, which supports source 30, is rotatable about axis A at rotational speed ω1;
- a source 30 of magnetic field, which is driven in rotation about axis A with a first rotational speed ω1; and
- an electric conductive element 32, which is operatively connected to mast 11 and is driven in rotation at a second rotational speed ω2 different from first rotational speed ω1.

In the embodiment, shown rotational speeds ω1, ω2 are directed in respective directions opposite to one another.

Electric conductive element 32 is electromagnetically coupled with said source 30, so that an electromotive force is magnetically induced, in use, in electric conductive element 32 itself.

In this way, source 30 and electric conductive element 32 form an electrical generator which, due to the differential rotational speed ω2-ω1, induces an electromotive force and therefore an electric current in blades 13 connected to hub 12 which is rotationally integral to mast 11.

In the embodiment shown, the electrical generator is an axial flux machine, in which the magnetic field generated by source 30 is mainly directed parallel to axis A.

In the embodiment shown, source 30 comprises a plurality of permanent magnets 81 while electric conductive element 32 is a winding of conductive coils.

Support element 36 comprises:
- a shaft 38 elongated about axis A;
- a pair of disks 39 protruding from shaft 38 orthogonally to axis A.

Disks 39 comprise respective faces 40 which face with one another along axis A and to which permanent magnets 81 are fitted.

Epicyclic gear train 37 substantially comprises:
- a radially outer toothing defined by an axially end gear 45 of shaft 38, which is arranged on the same axial side of support structure 10; gear 45 acts as the solar gear of the epicyclic train;
- a plurality of planet gears 46, which extend about respective axes F parallel to and staggered from axis A and have, each, a radially outer toothing with respect to relative axis F meshing with radially outer toothing of end gear 45;
- a carrier 47, which is rotationally integral and connected to planet gears 46 on one axial side and is connected to shaft 35 on the other axial side; and
- an annular ring 48, which is connected to and rotationally integral with hub 12 and which comprises a radially inner toothing with respect to axis A meshing with radially outer toothing of planet gears 46.

Planet gears 46 rotate about respective axes F revolute about axis A.

Hub 12 comprises:
- a main tubular body 51; and
- a pair of rings 52, 53 which extend from body 51 towards axis A and orthogonally to axis A.

Ring 52 bounds hub 12 on the opposite axial side of shaft 35.

Ring 53 is axially interposed between rings 52, 48. Furthermore, ring 48 extends from body 51 towards axis A and orthogonally to axis A.

Electric conductive element 32 is fitted to ring 52.

Ring 52 is axially interposed between disks 39 of support element 26.

In this way, electric conductive element 32 faces permanent magnets 81. Accordingly, permanent magnets 81 induce, by means of Faraday's law, an electromotive force on electric conductive element 32.

Rings 52, 53 surround shaft 38 and shaft 35 respectively with the interposition of a radial gap.

It is therefore possible to identify three assemblies inside rotor 3, which have relative rotational speed about axis A:
- support structure 10 and shaft 35, which are stationary about axis A;
- support element 36 and source 30, which rotate with rotational speed ω1 in a first direction about axis A; and
- mast 11, hub 12 with conductive electric element 32, which rotate with rotational speed ω2 in a second direction, opposite to first direction, about axis A.

Rotor 3 also comprises a hollow flow deflector 85 which is connected to an axial end of hub 12 and is rotationally integral with hub 12.

Flow deflector 85 bounds rotor 3 on the opposite axial side of support structure 10.

Flow deflector 85 houses one disk 39, a top axial end of shaft 38 opposite to shaft 46, and disk 52.

Furthermore, flow deflector 85 houses an electronic control unit 86 for controlling permanent magnets 81 and electric conductive element 32, as well as other systems for example AC/DC converters.

In one embodiment, flow deflector 85 is provided with an electrical power storage device 89, which is charged by the electrical current flowing inside electrical conductive element 32.

Flow deflector 85 is made in metal and comprises a plurality of thermally conductive rings 90 which are, in the embodiment shown, connected to ring 52.

Electric conductive element 32 is electrically connected to blades 13 by means of electric wires 87.

In this way, electrical current is available to blades 13.

In one embodiment, blades 13 comprise an electric circuit embedded inside blades 13 themselves and fed with electrical current.

This electric circuit operates as an anti-icing or de-icing system.

In another embodiment, blades 13 comprise actuators, which are fed with electrical current.

Rotor 3 further comprises, with respect to axis A,:
- a bearing 100, which is radially interposed between shaft 38 and hub 12, with respect to axis A; and
- a pair of axially spaced bearings 101 which are radially interposed between shaft 35 and mast 11 and hub 12, with respect to axis A.

In another embodiment, the output element of transmission group 33 operates an accessory component of rotor 3.

In use, the end shaft of main transmission group 7 drives in rotation sun gear 20 of epicyclic gear 17 about axis A. Accordingly, also planet gear 21 and carrier 22 rotate about axis A, thus driving in rotation mast 11, hub 12 and blades 13 about same axis A. Blades 13 are driven in rotation by hub 12 about axis A and can move with respect to hub 12 in a known manner.

Hub 12, ring 48 and therefore electrical conductive element 32 rotate about axis with rotational speed ω2 about axis A.

In the meanwhile, epicyclic gear train 37 receives the motion from ring 48 rotating with rotational speed $\omega 2$ about axis A and drives in rotation support element 36 with rotational speed $\omega 1$ about axis A.

In particular, ring 48 integral with hub 12 meshes with planet gears 46 stationary about axis A, and planet gears 46 mesh with gear 45 rotationally integral with support element 36.

In one embodiment, support element 36 supports source 30. Therefore, source 30 and permanent magnets 81 are driven in rotation with a rotational speed $\omega 1$. Furthermore, electric conductive element 32 rotates with a rotational speed $\omega 2$ different from rotational speed $\omega 1$, and permanent magnets 81 and conductive element 32 face with one another along axis A.

Thus, an electromotive force is magnetically induced, by means of Faraday's law, in electric conductive element 32 rotating integrally with hub 12.

Electrical wires 87 transfer electromotive force from conductive element 32 on hub 12 to blades 13.

This electromotive force is used for several purposes.

For example, it can be used for feeding electrical circuits inside blades 13 and providing de-icing or anti-icing function.

Alternatively or in combination, the electromotive force can be used for operating the actuators fitted to blades 13, e.g. for active aerodynamic control.

The heat generated by the operation of source 30 and electrical conductive element 32 is dissipated:
  by means of convection, thanks to air continuously flowing inside flow deflector 85; this is particularly favorable in the ice-protection case because of the low air temperatures associated with icing conditions; and
  by means of conduction, thanks to the fact that flow deflector 85 is made in metal and comprises rings 90 for thermal dissipation.

In case of fault of turbine 6, the electric power stored in electrical power storage device 89 housed in flow deflector 85 can be used for example to sustain the autorotation of hub 12 for a limited amount of time necessary to safely complete the autorotation maneuver.

In another embodiment, the output element of transmission group 33 operates an accessory component of rotor 3.

Figure 3:
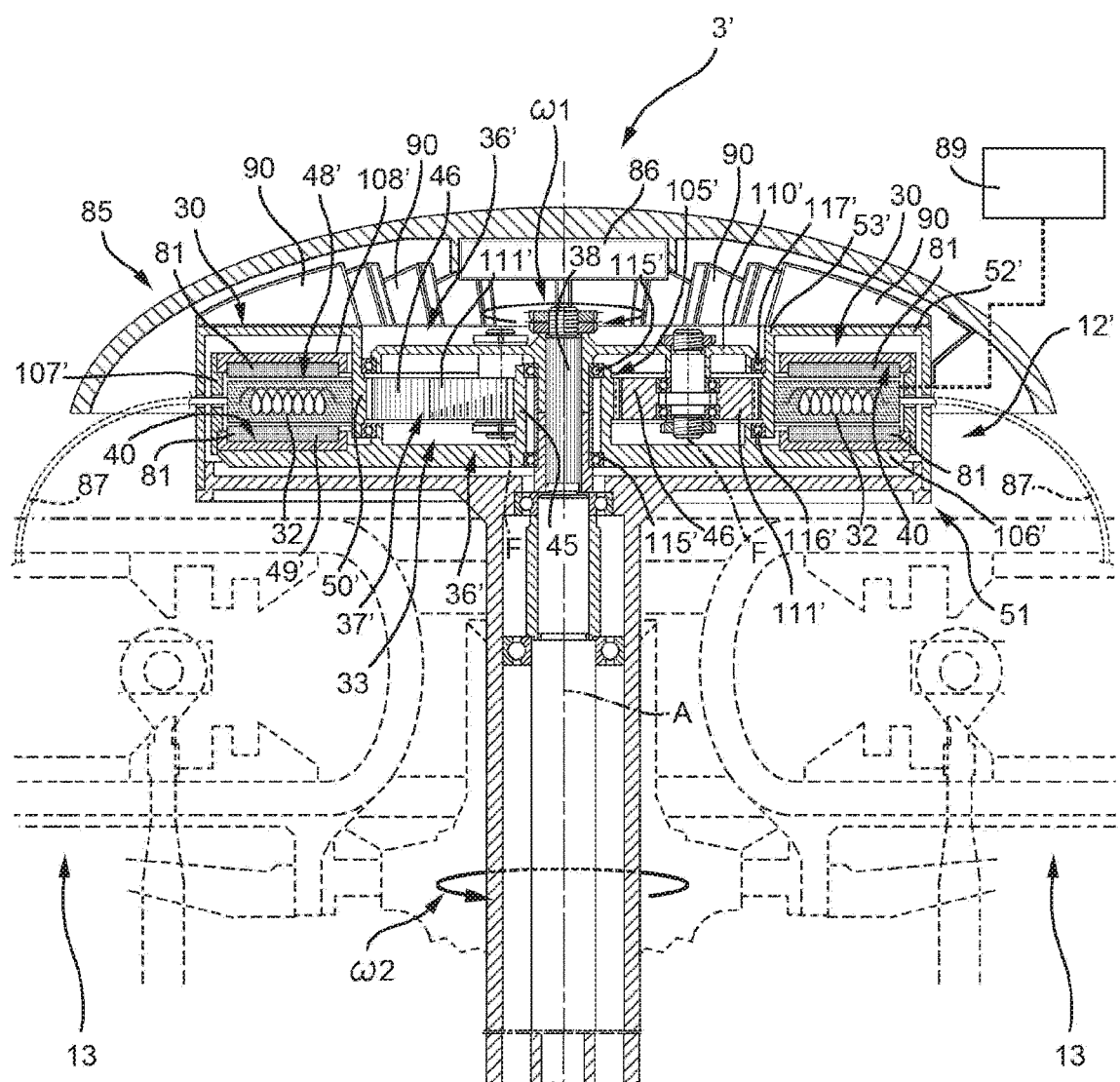
FIG. 3 is a transversal section of a second embodiment of the rotor of FIG. 1.

With reference to FIG. 3, 3' indicates, as a whole, a main rotor according to a second embodiment of the present invention.

Rotor 3' is similar to rotor 3 and will be described hereinafter only as far as it differs therefrom; corresponding or equivalent parts of rotors 3, 3' will be indicated where possible by the same reference numbers.

In particular, rotor 3' differs for rotor 3 in that carrier 47 and support element 36' are axially contained inside the axial size of hub 12'.

In detail, hub 12' comprises, instead of rings 52, 53 and ring 48:
  an annular disk 52' protruding from an axial end of body 51 arranged on the side of flow deflector 85 towards axis A and lying on a plane orthogonal to axis A;
  a cylindrical wall 53' protruding from a radial inner end of disk 52' towards support structure 10, coaxial to axis A and having an axial length smaller than body 51; and
  a ring 48' protruding from an axial end of wall 53' opposite to disk 52', lying on a plane orthogonal to axis A.

In particular, ring 48' comprises, with respect to axis A:
  a radially outer portion 49', which extends on the radial outer side of wall 53' on the opposite side of axis A; and
  a radially inner portion 50', which extends on the radial inner side of wall 53' towards axis A.

Support element 36' differs from support element 36 for comprising:
  a tubular body 105', which extends about axis A, surrounds an axial end of shaft 35 arranged on the side of flow deflector 85, and is rotatable about axis A with rotational speed $\omega 1$ with respect to stationary shaft 35;
  a disk 106', which lies on a plane orthogonal to axis A and radially protrudes from axial end of body 105' arranged on the side of support structure 10;
  a tubular wall 107', which extends about axis A, is radially opposite to body 105', axially protrudes from a radially outer end of disk 106' on side of support structure 10 and is separated by a radial gap from body 51 of hub 12'; and
  a disk 108', which radially protrudes from an axial end of wall 107' opposite to disk 106' and towards axis A.

Disk 108' is separated by an axial gap from disk 52' and by a radial gap from wall 107'.

Permanent magnets 81 are fitted on disk 108' and disk 106' and axially face with one another.

Portion 49' of ring 48' is axially interposed between disks 106', 108' and supports electric conductive element 32 in an axially interposed position between permanent magnets 81.

Support element 36' differs from support element 36 for comprising:
  a carrier 110', which axially protrudes from an axial end of shaft 35 and lies on a plane orthogonal to axis A; and
  a plurality of planet gears 111' fitted to carrier 110' and which mesh, each, with a radially inner toothing of portion 50' of ring 48' and with a radially outer toothing of body 105'.

In this way, epicyclic gear train 37' is formed by stationary planet gears 111', body 105' rotating at rotational speed $\omega 1$ together with source 30 and ring 48' rotating with hub 12 and rotational speed $\omega 2$ together with electrical conductive element 32.

Rotor 3' further comprises, with reference to axis A:
  a pair of axially spaced bearings 115' radially interposed between shaft 35 and body 105';
  a bearing 116' axially interposed between wall 53' and disk 106'; and
  a bearing 117' radially interposed between wall 53' and carrier 110'.

The operation of rotor 3' is similar to the one of rotor 4 and is therefore not described in detail.

Figure 4:
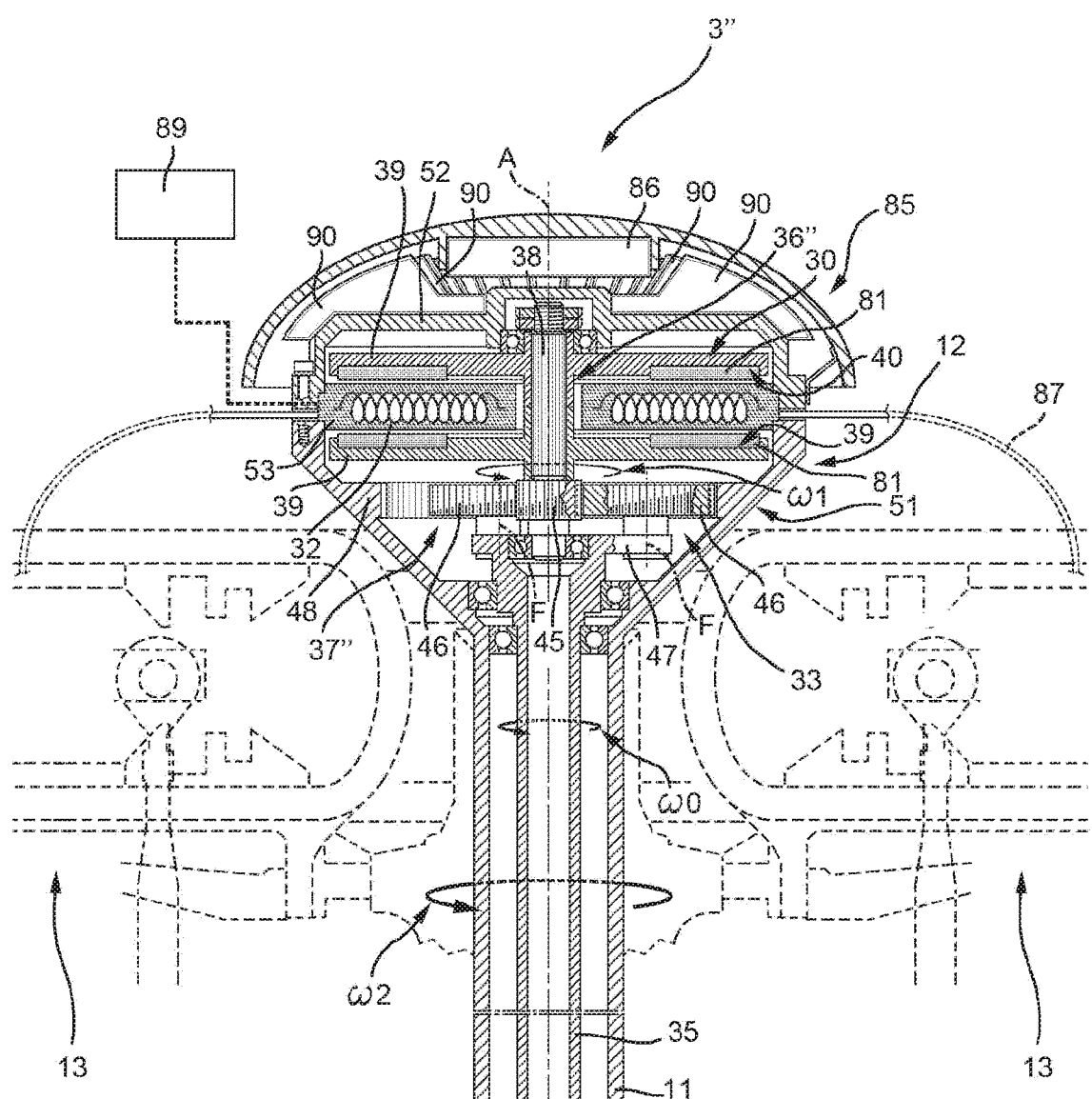
FIG. 4 is a transversal section of a third embodiment of the rotor of FIG. 1.

With reference to FIG. 4, rotor 3" is similar to rotor 3 and will be described hereinafter only as far as it differs therefrom; corresponding or equivalent parts of rotors 3, 3" will be indicated where possible by the same reference numbers.

In particular, rotor 3" differs for rotor 3 in that shaft 35 is rotationally integral and connected to sun gear 20 and is driven in rotation at rotational speed $\omega 0$.

Furthermore, rotor 3" differs from rotor 3 in that epicyclic gear train 37" of transmission group 36" receives the motion from shaft 35 rotating at rotational speed $\omega 0$ and drives in rotation support element 36", source 30 and permanent magnets 81 about axis A with rotational speed $\omega 1$.

It should be noted that rotational speed $\omega 1$ in rotor 3" is higher than rotational speed $\omega 1$ in rotor 3.

Accordingly, the differential rotational speed $\omega 2-\omega 1$ generating the electromotive force is higher in rotor 3" than in rotor 3.

It is therefore possible to identify three assemblies inside rotor 3", which have relative rotational speed about axis A:

shaft 35, which rotates with rotational speed ω0 about axis A in a first direction;

support element 36" and source 30, which rotate with rotational speed ω1 in the first direction about axis A; and mast 11, hub 12 with conductive electric element 32, which rotate with rotational speed ω2 in the first direction about axis A.

In the embodiment shown, rotational speeds ω0, ω1, ω2 are directed in the same direction.

The operation of rotor 3" is similar to rotor 3 and is described only insofar as it differs from that of rotor 3.

In particular, sun gear 20 drives in rotation at rotational speed ω0 shaft 35 and planet gears 46 of epicyclic gear train 37". The latter drives in rotation, in turn, support element 36", source 30 and permanent magnets 81 about axis A with rotational speed ω1.

The advantages of rotor 3, 3', 3" according to the present invention will be clear from the foregoing description.

In particular, epicyclic gear train 37, 37', 37" drives in rotation support element 36, 36', 36" with an rotational speed ω1, which is different from rotational speed ω2 with which mast 11 and hub 12 are driven in rotation about the same axis A.

Accordingly, support element 36, 36', 36" can be advantageously used for supporting accessory components to be driven with a rotational speed ω1, for example rotary vibration damping elements.

For the same reasons, support element 36, 36', 36" can be advantageously used for supporting source 30 at a rotational speed ω1 different from rotational speed ω2 at which conductive element 32 are driven, so as to generate, according to Faraday's law, an electrical current inside conductive element 32 fitted to hub 11.

The use of epicyclic gear train 37, 37', 37" is further advantageous since they provide high transmission ratio in a contained axial size.

Thus, epicyclic gear train 37, 37', 37" and support element 36, 36', 36" can be easily integrated in the customary size of rotor 3, 3', 3" without requiring any redesigning thereof.

For the same reasons, epicyclic gear train 37, 37', 37" and support element 36, 36', 36" can be easily retrofitted inside an already existing rotor 3, 3', 3". With reference to rotor 3', epicyclic gear train 37' is contained inside the axial size of hub 12, thus affecting substantially in no way the overall axial size of rotor 3'.

With reference to rotor 3", carrier 47 of epicyclic gear train 37" is fitted to sun gear 20 of epicyclic gear train 17 which rotates about axis A with rotational speed ω0.

Accordingly, it is possible to achieve a differential rotational speed ω2-ω1 between support element 36" and hub 12 higher than the corresponding differential rotational speed in rotor 3 and 3'.

Thus, it is possible to drive support element 36" and accessory components with a high rotational speed ω1, even when hub 12 and mast 11 are driven in rotation with a particularly slow rotational speed ω2, as it normally happens when rotor 3" is the main rotor of helicopter 1.

Clearly, changes may be made to rotor 3, 3', 3", and according to the present invention without, however, departing from the scope as defined in the accompanying Claims.

In particular, transmission group 33 could comprise instead of epicyclic gear 37, 37', 37" other transmission for element for driving in rotation support element 36, 36', 36" with rotational speed ω1.

Furthermore, the electrical generator formed by source and electrical conductive element 32 could be a radial flux machine, in which the magnetic field generated by source 30 is mainly directed radially with respect to axis A.

Furthermore, rotor 3, 3', 3" could comprise, instead of mechanical main and additionally transmission group 7, 8, an electrical motor for driving rotor 3, 3', 3". In this case, rotor 3, 3', 3" would comprise a stator to which source 30, 163 would be fitted and a rotor to which electrical circuit 32, 169 would be fitted.

Aircraft 1 could be a convertiplane instead of a helicopter.

Finally, rotor 3, 3', 3" could be an anti-torque tail rotor instead of a main rotor.

The invention claimed is:

1. A rotor (3, 3', 3") for an aircraft (1) capable of hovering, comprising:
   a stationary support structure (10);
   a rotative element (11), which is rotatable about a first axis (A) with respect to said stationary support structure (10) with a first rotational speed (ω2);
   a hub (12), which is rotationally integral to said rotative element (11);
   a ring (48, 48'), which is connected to and angularly integral with said hub (12); and
   at least one blade (13), which is operatively connected with said rotative element (11) and is articulated onto said hub (12);
   characterized by comprising a transmission group (33), which comprises an output element (36, 36', 36") rotatable about said first axis (A) with a second rotational speed (o)1) different from said first rotational speed (ω2);
   said transmission group (33) comprising a first epicyclic gear train (37, 37', 37");
   said first epicyclic gear train (33) receiving, in use, the motion from said ring (48, 48') and driving in rotation, in use, said output element (36, 36', 36") with said second rotational speed (ω1).

2. The rotor of claim 1, characterized by comprising:
   a first gear (45), which is defined by said output element (36, 36', 36") and is rotatable about said first axis (A);
   a second gear (48) rotationally integral with and driven in rotation, in use, by said hub (12) about said first axis (A); and
   at least one pair of third planet gears (46); and
   a first carrier (47), which is connected to said third planet gears (46);
   said at least one pair of third planet gears (46) simultaneously meshing with said first gear (45) and said second gear (48), being rotatable about respective second axes (F) parallel and distinct from said first axis (A) and being mounted to revolute about said first axis (A).

3. The rotor of claim 2, characterized by comprising a second epicyclic gearing (17), which comprises:
   a sun gear (20) which is connectable to an output shaft of an additional transmission group (8) of said aircraft (1) and is rotatable about said first axis (A) with said first rotational speed (ω2);
   a crown gear (23) which is defined by support structure (10) and is stationary about said first axis (A);
   a plurality of additional planet gears (21) which simultaneously mesh with said sun gear (20) and said crown gear (23); and
   a second carrier (22), which is connected to said additional planet gears (21) and to said rotative element (11);
   said additional planet gears (21) being rotatable about respective third axes (E) parallel to said first axis (A) and being mounted to revolute about said first axis (A).

4. The rotor of claim 3, characterized in that said at least one pair of third planet gears (46) are stationary about said first axis (A) and are connected to said support structure (10).

5. The rotor of claim 3, characterized in that said second carrier (47) and said output element (36') are axially contained inside the axial size of said hub (12).

6. The rotor of claim 5, characterized in that said at least one pair of third planet gears (46) are rotationally integral and driven in rotation by said sun gear (20).

7. The rotor of claim 1, characterized in that said output element (36, 36', 36") supports a source (30) of a magnetic field;

said hub (12) supporting an electric conductive element (32), which is operatively connected to said rotative element (11);

said electric conductive element (32) being electromagnetically coupled with said source (30), so that an electromotive force is magnetically induced, in use, in said electric conductive element (32).

8. An aircraft (1) capable of hovering comprising:

a fuselage (2) to which said support structure (10) is fixed;

a main transmission group (6); and a main rotor (3, 3', 3") according to claim 1.

\* \* \* \* \*